United States Patent Office 3,440,285
Patented Apr. 22, 1969

3,440,285
ALDEHYDES AND ALCOHOLS PREPARED THEREFROM
Bernard M. Lichstein, Elizabeth, and Cyril Woolf, Morristown, N.J., assignors to Allied Chemical Corporation, New York, N.Y., a corporation of New York
No Drawing. Filed Apr. 1, 1966, Ser. No. 539,265
Int. Cl. C07c *47/18, 31/18*
U.S. Cl. 260—602                                            4 Claims

ABSTRACT OF THE DISCLOSURE

A process for preparing hydroxy-substituted fluorinated aldehydes whereby a perhalogenated fluorine-containing ketone is reacted with a saturated aliphatic aldehyde in the presence of an alkali metal fluoride or alkaline earth metal fluoride catalyst. The resultant fluorinated aldehyde products can be reduced to their corresponding dihydric alcohols.

---

This invention relates to novel hydroxy-substituted fluorinated aldehydes and methods for their preparation and in particular relates to aldehydes terminated at one end by a di-(perhaloalkyl) carbinol group, wherein at least one fluorine atom is attached to each carbon atom of the haloalkyl radicals.

This invention further relates to novel fluorinated dihydric alcohols prepared by the reduction of the above aldehydes.

The hydroxy-substituted fluorinated aldehydes of the present invention are compounds of the formula:

$$\text{HO}-\underset{\underset{R_2}{|}}{\overset{\overset{R_1}{|}}{C}}-\underset{\underset{R_4}{|}}{\overset{\overset{R_3}{|}}{C}}-\overset{\overset{O}{\diagup}}{C}\diagdown_{H}$$

where $R_1$ and $R_2$ are perhalogenated alkyl groups in which the halogen atoms are selected from the group consisting of fluorine and chlorine with at least one fluorine atom being attached to each carbon atom and $R_3$ and $R_4$ are members selected from the group consisting of hydrogen and alkyl groups. Preferably $R_1$ and $R_2$ each contain from 1 to 5 carbon atoms and when $R_3$ and $R_4$ are alkyl groups, each contains 1 to 5 carbon atoms.

These compounds are useful as intermediates in the preparation of new fluorinated dihydric alcohols, as will be further illustrated herein.

The hydroxy-substituted fluorinated aldehydes can be prepared by the reaction of a perhalogenated ketone with an aldehyde as illustrated by the following equation:

(1)    $\underset{\underset{R_2}{|}}{\overset{\overset{R_1}{|}}{C}}=O + H\underset{\underset{R_4}{|}}{\overset{\overset{R_3}{|}}{C}}-\overset{\overset{O}{\diagup}}{C}\diagdown_{H} \longrightarrow HO-\underset{\underset{R_2}{|}}{\overset{\overset{R_1}{|}}{C}}-\underset{\underset{R_4}{|}}{\overset{\overset{R_3}{|}}{C}}-\overset{\overset{O}{\diagup}}{C}\diagdown_{H}$ wherein $R_1$, $R_2$, $R_3$ and $R_4$ have the meanings given above. As shown in this equation, the reaction site on the aldehyde is a carbon atom adjacent to the carbonyl group.

The reaction between the perhalogenated ketone and the aldehyde is preferably conducted in the presence of a catalyst selected from the group consisting of alkali metal fluorides and alkaline earth metal fluorides. Particularly outstanding results have been obtained using cesium fluoride as the catalyst. Advantageously, the mol ratio of ketone to catalyst is about 10:1 to about 100:1; although larger or smaller amounts of catalyst can be employed.

Preferably, the halogenated ketone and the aldehyde are reacted in approximately equivalent molar proportions, but an excess of either reactant can be used. The presence of a large excess of aldehyde tends to promote the formation of side products and should be avoided.

The reaction proceeds readily and can be conducted over a wide temperature range. Advantageously, the reaction is carried out at a temperature of about −100° C. to +80° C.

The following example illustrates the preparation of the hydroxy-substituted fluorinated aldehydes. In the example, parts are by weight.

Example 1

Seven parts of thoroughly dried cesium fluoride and 207 parts of anhydrous ethyl ether were admixed in a pressure vessel under a nitrogen atmosphere. The mixture was cooled to −78° C. and 290 parts of hexafluoroacetone was added thereto. Still maintaining the temperature at −78° C., 117 parts of acetaldehyde was added dropwise. The mixture was stirred at −78° C. for 8 hours, at 0° C. for 1 hour, and at room temperature for 16 hours. The reaction mixture was fractionated under vacuum through two traps: the first trap being maintained at −196° C. and the second at −80° C. The contents of the traps were collected and fractionally distilled under a pressure of 10 mm. Hg. The material distilling in the range of about 40.5° to 55.5° C. was collected and identified as 3,3-bis(perfluoromethyl)-3-hydroxypropionaldehyde by infrared and elemental analyses. The elemental analysis was as follows. Calculated: F, 54.26%; H, 1.92%. Found: F, 52.8%; H, 2.0%. The refractive index was $n_D^{25°\,C.} = 1.3395$.

As set forth in Equation 1, other hydroxy-substituted fluorinated aldehydes within the scope of this invention can be prepared by substituting other perhalogenated acetones and/or other aldehyde reactants for the hexafluoroacetone and/or acetaldehyde employed in the above example. Such products can be prepared following the same general procedure as outlined in the above example making appropriate adjustments in such conditions as the temperatures used in the fractional distillations. Illustrative of suitable perhalogenated ketones which can be used in place of hexafluoroacetone are octafluorobutanone; decafluoro-2-pentanone; decafluoro-3-pentanone; 2-trifluoromethyl-3-perfluoropentanone; dodecafluoro-3-hexanone; tetradecafluoro-4-heptanone; perfluoro-6-undecanone; α-chloropentafluoroacetone; α,α-dichlorotetrafluoroacetone; α,α'-dichlorotetrafluoroacetone; and α,α,α'-trichlorotrifluoroacetone. Illustrative of suitable aldehydes which can be used in place of acetaldehyde are propionaldehyde, butyraldehyde, t-butyraldehyde, valeraldehyde and caproaldehyde.

The hydroxy-substituted fluorinated aldehydes of this invention can be reduced to form novel fluorinated dihydric alcohols of the formula:

$$\text{HO}-\underset{\underset{R_2}{|}}{\overset{\overset{R_1}{|}}{C}}-\underset{\underset{R_4}{|}}{\overset{\overset{R_3}{|}}{C}}-CH_2OH$$

wherein $R_1$, $R_2$, $R_3$, and $R_4$ have the meanings given above. It is not nesessary to purify the hydroxy-substituted fluorinated aldehyde, but rather a reducing agent can be added to the crude reaction mixture obtained by reacting the aldehyde and the perhalogenated ketone. The reduction can be accomplished by any of the known methods for reducing an aldehyde to an alcohol. Particularly good results have been obtained by reacting the hydroxy-substituted fluorinated aldehyde with lithium aluminum hydride. Advantageously, the reaction is carried out in an ether solvent medium. Other solvent media include tetrahydrofuran and anhydrous dioxane.

In a typical procedure, about 0.5 to 1.0 mol of lithium aluminum hydride per mol of aldehyde is employed and the reaction is carried out at a temperature of −80° C. to +35° C. After reduction, the reaction mixture is hydrolyzed with water until gas evolution ceases and is acidified with a mineral acid such as sulfuric acid. The ether layer is then separated from the aqueous phase and the alcohol dissolved therein is recovered by stripping off the ether.

Other means of reducing the aldehydes of this invention to dihydric alcohols include reaction with any one of lithium borohydride, sodium borohydride or aluminum isopropoxide in accordance with known procedure or hydrogenation in the presence of a platinum, rhodium or Raney nickel catalyst. The fluorinated dihydric alcohols undergo typical diol reactions and are useful as intermediates in the preparation of other compounds. For example, the alcohols of this invention can be converted to esters by reaction with acids, acid chlorides or acid anhydrides. Typical of such esterification is the reaction of 1,1-bis(perfluoromethyl)-1,3-propanediol with benzoyl chloride to form 1,1-bis(perfluoromethyl)propane-1,3-dibenzoate. Esters of the alcohols of this invention and benzoyl chloride are thermally stable compounds which can be used as lubricants and heat transfer media.

The fluorinated dihydric alcohols can be used in the preparation of a number of polymers by conventional processes. For instance, polyesters can be prepared by reacting the diols with dicarboxylic acid chlorides such as isophthaloyl chloride, polycarbonates can be prepared by reacting the diols with phosgene, and epoxy resins can be prepared by reacting the diols with epichlorohydrin.

The following examples illustrate the preparation of the fluorinated dihydric alcohols. In the examples, parts are by weight.

Example 2

170 parts of 3,3-bis(perfluoromethyl)-3-hydroxy propionaldehyde, prepared by the general procedure of Example 1, was dissolved in 360 parts of anhydrous ethyl ether. The resulting solution was added dropwise over a 30-minute period to a stirred slurry of 14 parts of lithium aluminum hydride and 180 parts of anhydrous ethyl ether while maintaining the reaction mixture from 15° C. to 21° C. The reaction was terminated by the addition of water following which the reaction mixture was acidified with dilute sulfuric acid. The reaction mixture was filtered and the aqueous and ether layers were then separated. The aqueous layer was extracted with ethyl ether and the ether layer and extract were combined. The bulk of the ether was distilled off at room temperature. The residue was then fractionally distilled under vacuum. The fraction (59 parts) collected at 51.5°–57.0° C. under 1 mm. Hg pressure was found to be 1,1-bis(perfluoromethyl)-1,3-propanediol by infrared analysis.

Example 3

342 parts of hexafluoroacetone was condensed into a pressure vessel containing 17.6 parts of dried cesium fluoride at a temperature of −78° C. under a nitrogen atmosphere. The pressure vessel was warmed to room temperature and 91.5 parts of acetaldehyde was added thereto over a 4¼-hour period. The crude reaction product was then dissolved in 285 parts of ethyl ether and this solution was slowly fed into a slurry of 59.7 parts of lithium aluminum hydride in 1780 parts of anhydrous ethyl ether. On completion of this addition, the excess lithium aluminum hydride was decomposed by adding water until gas evolution ceased.

The reaction mixture was acidified with 30% sulfuric acid followed by the addition of sufficient water to dissolve the solids present. The mixture was filtered and the ether and aqueous layers separated. The aqueous layer was extracted with five 140-part portions of ethyl ether. The ether layer and the ether extracts were combined and dried over magnesium sulfate. All volatiles were removed at room temperature under a reduced pressure of 30–150 mm. Hg. The residue was fractionally distilled at 15 mm. Hg pressure on a spinning band column. A total of 218.5 parts of 1,1-bis(perfluoromethyl)-1,3-propanediol was collected. The product had a boiling point of 86° C. at 18 mm. Hg pressure and refractive index was $n_D^{25°\,C.} = 1.3411$. Elemental analysis was as follows: Calculated: C, 28.32%; H, 2.85%; F, 53.75%. Found: C, 28.4%; H, 2.85%; F, 53.8%.

It will be apparent that many modifications and variations may be effected without departing from the scope of the present invention, and the illustrative details disclosed are not to be construed as imposing undue limitations on the invention.

We claim:

1. A process for the preparation of a compound of the formula

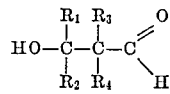

wherein $R_1$ and $R_2$ are perhalogenated alkyl groups in which the halogen atoms are selected from the group consisting of fluorine and chlorine with at least one fluorine atom being attached to each carbon atom and $R_3$ and $R_4$ are members selected from the group consisting of hydrogen and alkyl groups, said process comprising reacting a ketone of the formula:

wherein $R_1$ and $R_2$ have the meanings given above, with an aldehyde of the formula:

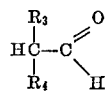

wherein $R_3$ and $R_4$ have the meanings given above in a mol ratio of at least one mol of said ketone per mol of said aldehyde in the presence of a catalyst selected from the group consisting of alkali metal fluorides and alkaline earth metal fluorides at a temperature of from about −100° C. to about 80° C.

2. A process as claimed in claim 1, wherein said catalyst is cesium fluoride.

3. A process for the preparation of a dihydric alcohol of the formula:

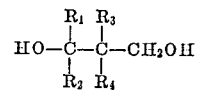

wherein $R_1$ and $R_2$ are perhalogenated alkyl groups in which the halogen atoms are selected from the group consisting of fluorine and chlorine with at least one fluorine atom being attached to each carbon atom and $R_3$ and $R_4$ are members selected from the group consisting of hydrogen and alkyl groups, said process comprising reacting a ketone of the formula:

wherein $R_1$ and $R_2$ have the meanings given above in a mol ratio of at least one mol of said ketone per mol of said aldehyde in the presence of a catalyst selected from the group consisting of alkali metal fluorides and alkaline earth metal fluorides at a temperature of from −100° C. to about 80° C. with a compound of the formula:

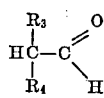

wherein $R_3$ and $R_4$ have the meanings given above, to form an aldehyde of the formula:

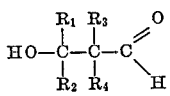

wherein $R_1$, $R_2$, $R_3$ and $R_4$ have the meanings given above, and reducing said aldehyde to form a dihydric alcohol of the above-given formula.

4. A process as claimed in claim 1 wherein the mol ratio of ketone to catalyst is from about 10:1 to about 100:1.

References Cited

UNITED STATES PATENTS 3,284,509   11/1966   Davis _____ 260—602

OTHER REFERENCES

Houben-Weyl: Method der organ. Chemie, vol. 7, part 1, pages 76–77, 1954.

LEON ZITVER, *Primary Examiner.*

R. H. LILES, *Assistant Examiner.*